UNITED STATES PATENT OFFICE.

HENRY D. WINTON, OF WELLESLEY HILLS, MASSACHUSETTS, ASSIGNOR OF ONE-HALF TO FRANCIS C. HERSEY, OF WELLESLEY HILLS, MASSACHUSETTS.

METHOD OF PRESERVING CEREALS.

SPECIFICATION forming part of Letters Patent No. 713,582, dated November 11, 1902

Application filed July 14, 1902. Serial No. 115,581. (No specimens.)

*To all whom it may concern:*

Be it known that I, HENRY D. WINTON, a citizen of the United States, residing at Wellesley Hills, in the county of Norfolk and State of Massachusetts, have invented a new and useful Improvement in Methods for the Treatment of Cereals, of which the following is a full, clear, and exact description.

My invention relates to a method of treating cereal foods for the purpose of obtaining a perfectly clean, wholesome, and palatable food put up in a form to best protect it against deterioration by molding, souring, and the action of germs. I am aware that many attempts have been made to protect this class of foods by sterilization, chemical treatment, coating of the granules, and pressing them into cakes or packages; but none of the processes has proved efficient, or, if efficient in some respects, the processes have failed in others, so that the products were not marketable.

By my improved process I am enabled not only to treat the cereals in a simple and effectual way, but I am enabled to put the food into a marketable condition by which it is preserved in a perfectly clean, wholesome, palatable, and attractive form and in a manner to best protect it against putrefaction of organisms.

My method or process, together with the various modifications of it, may be explained as follows: The stages of the process consist in first cleaning the natural or uncooked cereal after it has been crushed or ground to the desired granulation by passing it through a machine which removes all dust and dirt; then more thoroughly purifying the cereal and protecting it by sterilization and antiseptic treatment by passing the same through an oven to raise the temperature of the crushed cereal to a degree that will destroy any forms of bacteria that may exist in it and at the same time introducing into the oven fumes of sulfur or salt, or both, to act as an antiseptic treatment and incidentally to whiten and improve the appearance of the cereal food; then passing it through a stirring-machine, which thoroughly stirs the granulated product while a small amount of syrup composed of sugar and water is being fed to it, so that each particle by the action of the stirring is coated with a film of this syrup; then feeding the moistened granulated product to the hopper of a molding-machine, which automatically compresses it into small cubes, blocks, or tablets and delivers them upon suitable plates which are placed in heated ovens, and when thoroughly dried removing these blocks or tablets from the ovens and packing them in suitable boxes or cartons for the market.

The purpose of each of the steps of the process is first to cleanse the crushed cereal of all dust and dirt, which carries bacteria or impurity, and then by passing it through an oven or heater at the proper temperature destroy living bacteria or germs that exist in the crushed cereal as far as possible, and then by the introduction of the fumes of an antiseptic agent protect it against the action of putrefaction, and by the use of sulfur or salt, or both, a bleaching action of the crushed cereal may be had to whiten it and give it a cleanly appearance.

In further elaboration of this process after having put the crushed cereal in as wholesome condition as possible I mix it with a syrup of sugar, which is preferably dissolved in cold water, or, at any rate, which is not a cooked syrup, which should be of a gage of 30° Baumé scale. This depends upon the character of the cereal to be treated and the character of the granulation, a greater or less quantity being used and of more or less density, according to the product which is being treated. The syrup acts to coat each granular particle of the cereal and protect it against deterioration and at the same time acts as a cementing agent to hold the granules together when they are compressed. The granules are compressed while they are still moist with the syrup into small blocks or tablets and when delivered from the press in soft blocks are immediately transferred to heated ovens to thoroughly dry them and evaporate all moisture. The granules are then wholly coated by a film of syrup, which keeps out the air, and then again each granule is protected by its neighbors by being pressed into a mass, thus leaving the finished block of crushed cereal as entirely protected as possible, and when packed closely together in boxes it is thoroughly protected against deterioration by the action of germs and putrefaction of the same and also against danger of molding or souring, being free from moisture and protected from atmospheric conditions which would otherwise act to destroy it. Further, the cereals so treated retain their natural appearance, as the coating with the syrup does not soak perceptibly into the particles, so that the fiber is liable to be broken or crushed down under pressure, but the cereal retains its granulated appearance in the blocks or tablets, and on the evaporation of the water of the syrup there is no gloss or pasty appearance given to the product, but it has all the desirable treatment for protection, while its appearance is not in any way deteriorated.

In the treatment of cereals by this process I may vary the stages somewhat according to the character of the cereal to be operated upon, and I may leave out some of the steps or stages. For instance, I may, instead of introducing the antiseptic or bleaching fumes, leave out this step, or I may, for instance, add to the syrup solution some agent having antiseptic qualities, or I may in lieu of this treat the blocks during the process of drying to the fumes of an antiseptic agent or a bleaching agent by introducing such agent into the heated air passing through the ovens, or I may leave out of the process the step of heating the crushed cereal before it is pressed into blocks and attain this object by using a high temperature in the final drying, the object of my invention being more particularly to subject the cereal to stages of treatment, fully or partially, which afford the very best protection for the cereal against deterioration. Any adhesive and preserving fluid having the characteristics of the syrup of sugar may be substituted therefor. There are some cereals which have been partially treated by heat, so that they are not entirely uncooked; but for the purposes of this invention or discovery they may be considered substantially uncooked foods.

It should be understood that the invention herein described relates only to the treatment of the forms of cereals now commonly used for food and that the purpose of the invention is not in any way to change the shape of the granules of such cereals or their properties when cooked, but simply to preserve their present qualities in a more permanent way by affording a protection against such destructive tendencies as they are now subject to. To this end the cereal as ordinarily prepared for the market is subjected to antisepsis, first, by a thorough cleansing, then by subjecting the same to the fumes of an antiseptic material at a high temperature, and then incasing or sealing each granule of the cereal with a thin antiseptic coating, (and I prefer for this purpose that a material be used which shall also act to bind or tie together the granules in the form of a block and which shall be made hard and non-adhesive by heat.) It is not intended that the substance used for this purpose shall in any way affect the quality or flavor of the cereals when cooked. It is applied to the granules in very thin films and while in a warm and moist condition, and the granules thus provided with thin films are combined together by light pressure while they are still warm and moist, and this is done without fracturing or opening the individual films or coatings or crushing the granules. The antiseptic coating is then hardened and made absolutely non-adhesive by subjecting the block to a drying influence, preferably in an oven. The degree of the coating applied to the granules is of the slightest. It is not sufficient to sweeten the cooked cereal. It is not even sufficient to cause the granules to adhere together without the use of a mild pressure, and it would be of no value as a binding agent were it not capable of being hardened by drying.

Having thus fully described my invention, I claim and desire to secure by Letters Patent of the United States—

1. The herein-described method of treating cereal foods, for preserving same, such method comprising the following steps: subjecting the granulated cereal to the fumes of an antiseptic material at a high temperature, mixing with the granulated cereal a thin sugar-syrup while the said granulated cereal is being rapidly agitated, for the purpose of coating the granules, compressing the coated granules into blocks, and subjecting the said blocks to a high temperature for the purpose of drying the same.

2. The herein-described method of treating cereal foods, for preserving same, such method comprising the following steps: thoroughly cleansing the granulated cereal, subjecting the same to the fumes of an antiseptic material at a high temperature, mixing with the granulated cereal a thin sugar-syrup while the said granulated cereal is being rapidly agitated, for the purpose of coating the granules, compressing the coated granules into blocks, and subjecting the said blocks to a high temperature for the purpose of drying the same.

HENRY D. WINTON.

Witnesses:
 F. F. RAYMOND, 2d,
 J. M. DOLAN.